US010833969B2

(12) United States Patent
Guim Bernat et al.

(10) Patent No.: US 10,833,969 B2
(45) Date of Patent: Nov. 10, 2020

(54) METHODS AND APPARATUS FOR COMPOSITE NODE MALLEABILITY FOR DISAGGREGATED ARCHITECTURES

(71) Applicant: INTEL CORPORATION, Santa Clara, CA (US)

(72) Inventors: Francesc Guim Bernat, Barcelona (ES); Susanne M. Balle, Hudson, NH (US); Daniel Rivas Barragan, Cologne (DE); John Chun Kwok Leung, Folsom, CA (US); Suraj Prabhakaran, Aachen (DE); Murugasamy K. Nachimuthu, Beaverton, OR (US); Slawomir Putyrski, Gdynia (PL)

(73) Assignee: INTEL CORPORATION, Santa Clara, CA (US)

( * ) Notice: Subject to any disclaimer, the term of this patent is extended or adjusted under 35 U.S.C. 154(b) by 306 days.

(21) Appl. No.: 15/655,855

(22) Filed: Jul. 20, 2017

(65) Prior Publication Data
US 2018/0026912 A1     Jan. 25, 2018

Related U.S. Application Data

(60) Provisional application No. 62/427,268, filed on Nov. 29, 2016, provisional application No. 62/423,727, (Continued)

(51) Int. Cl.
*H04L 12/26*     (2006.01)
*G06F 16/22*     (2019.01)
(Continued)

(52) U.S. Cl.
CPC .......... *H04L 43/16* (2013.01); *G06F 16/2282* (2019.01); *G06F 16/2379* (2019.01);
(Continued)

(58) Field of Classification Search
CPC . H04L 43/16; H04L 43/0858; H04L 43/0876; H04L 43/0894; H04L 41/0816;
(Continued)

(56) References Cited

U.S. PATENT DOCUMENTS

2007/0106796 A1* 5/2007 Kudo ..................... G06F 9/5061
                                                              709/226
2013/0170334 A1* 7/2013 Koinuma ................ H04L 29/14
                                                              370/216
(Continued)

*Primary Examiner* — James E Springer

(57) ABSTRACT

Techniques for increasing malleability in software-defined infrastructures are described. A compute node, including one or more processor circuits, may be configured to access one or more remote resources via a fabric, the compute node may be configured to monitor utilization of the one or more remote resources. The compute node may be further configured to identify based on one or more criteria that one or more remote resources may be released and initiate release of identified one or more remote resources. The compute node may be configured to generate a notification to a software stack indicating that the identified one or more remote resources has been released. Other embodiments are described and claimed.

25 Claims, 18 Drawing Sheets

Related U.S. Application Data filed on Nov. 17, 2016, provisional application No. 62/376,859, filed on Aug. 18, 2016, provisional application No. 62/365,969, filed on Jul. 22, 2016.

(51) Int. Cl.

| | | |
|---|---|---|
| *G06F 16/23* | (2019.01) | |
| *H04L 12/24* | (2006.01) | |
| *H04L 12/927* | (2013.01) | |
| *H04Q 9/00* | (2006.01) | |
| *H04L 29/08* | (2006.01) | |
| *H04L 12/925* | (2013.01) | |

(52) U.S. Cl.
CPC ...... *H04L 41/0816* (2013.01); *H04L 41/0896* (2013.01); *H04L 41/12* (2013.01); *H04L 41/5025* (2013.01); *H04L 43/0876* (2013.01); *H04L 47/803* (2013.01); *H04L 67/10* (2013.01); *H04L 67/1031* (2013.01); *H04L 67/34* (2013.01); *H04Q 9/00* (2013.01); *H04L 41/16* (2013.01); *H04L 41/5009* (2013.01); *H04L 41/5054* (2013.01); *H04L 43/0858* (2013.01); *H04L 43/0894* (2013.01); *H04L 47/722* (2013.01); *H04L 47/805* (2013.01); *H04Q 2209/20* (2013.01)

(58) Field of Classification Search
CPC ..... H04L 41/12; H04L 41/5025; H04L 41/16; H04L 47/803; H04L 47/722; H04L 47/805; H04L 67/1031; H04L 67/34; G06F 16/2379; G06F 16/2282; H04Q 9/00; H04Q 2209/20
USPC ........................................................ 709/224
See application file for complete search history.

(56) References Cited

U.S. PATENT DOCUMENTS

| | | | |
|---|---|---|---|
| 2013/0232254 A1* | 9/2013 | Srikanth | H04L 43/0876 709/224 |
| 2015/0222361 A1* | 8/2015 | Dhaini | H04Q 11/0067 398/66 |
| 2015/0268998 A1* | 9/2015 | Koza | H04L 63/104 718/104 |
| 2016/0301779 A1* | 10/2016 | Cui | H04L 45/566 |
| 2017/0031794 A1* | 2/2017 | Cardonha | G06F 11/3409 |
| 2017/0141950 A1* | 5/2017 | Wackerly | H04L 41/5025 |
| 2017/0277806 A1* | 9/2017 | Trossen | H04L 67/2842 |
| 2019/0273681 A1* | 9/2019 | Williams | H04L 45/42 |

* cited by examiner

*800*

METHODS AND APPARATUS FOR COMPOSITE NODE MALLEABILITY FOR DISAGGREGATED ARCHITECTURES

RELATED APPLICATIONS

This application claims priority to U.S. Provisional Patent Application No. 62/427,268, filed Nov. 29, 2016; U.S. Provisional Patent Application No. 62/423,727, filed Nov. 17, 2016; U.S. Provisional Patent Application No. 62/376,859, filed Aug. 18, 2016; and U.S. Provisional Patent Application No. 62/365,969, filed Jul. 22, 2016; each of which is hereby incorporated by reference in its entirety.

BACKGROUND

Applications executed in a data center may use a set of resources in order to achieve a certain goal (e.g., process database queries performed by users). Applications may be sensitive to a subset of resources from all the resources available within a particular data center. For example a database within the data center may use processors, memory, disk, and fabric, but may be most sensitive to processor and memory availability and performance. Data center throughput may be increased by adding resources, such as memory and compute bandwidth and power. However, increasing other resources, such as fabric or disk may not provide a direct benefit to throughput. Furthermore, reduction of memory or compute bandwidth may have negative impact on throughput. Data center architectures have addressed the problem of mapping the correct amount of resources to the applications using applications requirements, which may be provided by the user or directly by the application, in order to do the proper resource selection and allocation. This process may include selecting the set of resources and also ensuring that certainty quantities and qualities such as the needed Quality of Service (QoS) are reserved to satisfy the requirements. However, in many data center architectures, such as those using software defined infrastructure, there are remaining challenges with respect to the correct allocation and management of resources. Accordingly, improved techniques for the management of resources within data center architectures are desirable.

DETAILED DESCRIPTION

Figure 1:
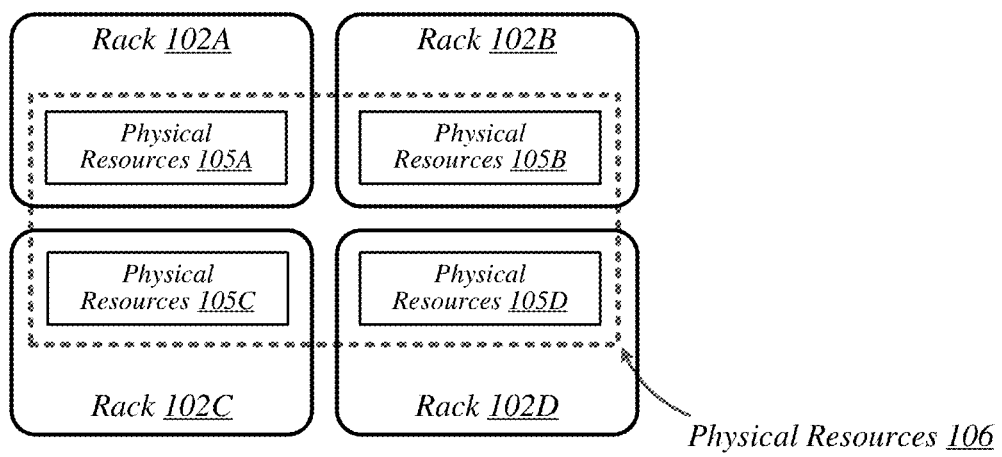
FIG. 1 illustrates an example of a data center.

Various embodiments are generally directed to techniques for management of software defined infrastructure (SDI) systems. In particular, some embodiments are directed to dynamic adjustment of resources during application runtime on an SDI system. These techniques allow applications to use more or less of a given resources during runtime, and improve overall system performance by taking advantage of resource malleability during application runtime.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given. The devices described herein may be any of a variety of types of computing devices, including without limitation, a server, a workstation, a data center, or the like.

In various embodiments, the aforementioned processors may include any of a wide variety of commercially available processors, including without limitation, an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, the aforementioned storages may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, networks may be a single network possibly limited to extending within a single building or other relatively limited area, a combination of connected networks possibly extending a considerable distance, and/or may include the Internet. Thus, networks may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the aforementioned interfaces may include circuitry providing at least some of the requisite functionality to enable such coupling. However, the aforementioned interfaces may also be at least partially implemented with sequences of instructions executed by the processor elements (e.g., to implement a protocol stack or other features). Where one or more portions of the networks may employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the networks entail the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation. Furthermore, as used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrase "at least one of A, B or C" can mean A; B; C; A and B; A and C; B and C; or A, B and C.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twister pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

Figure 2:
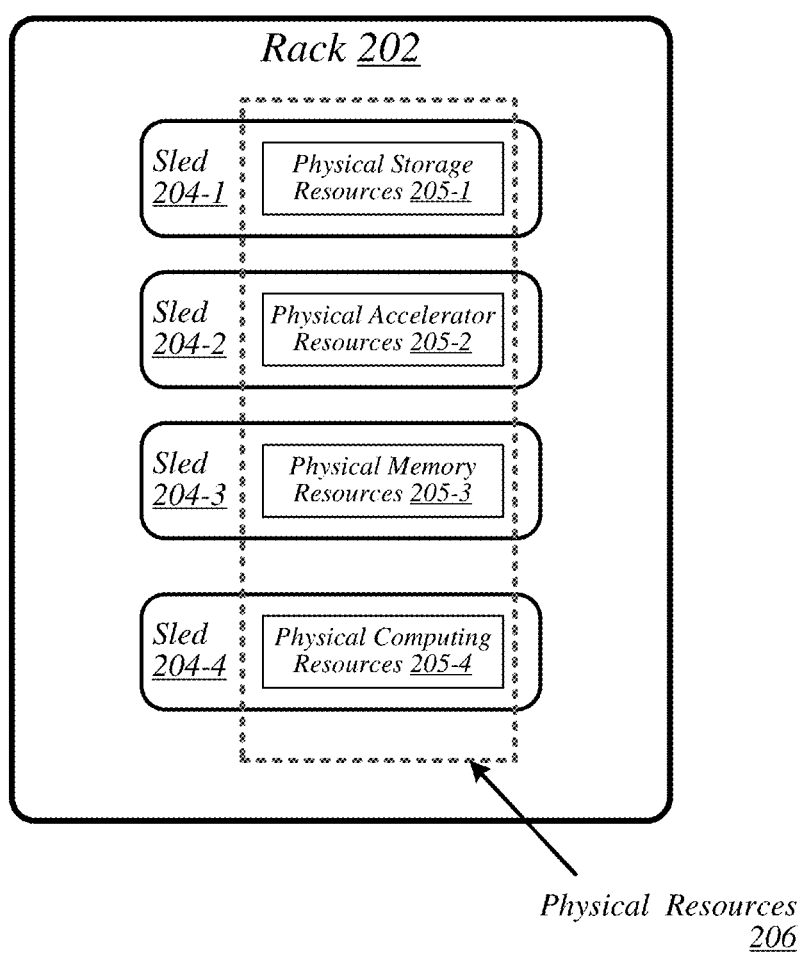
FIG. 2 illustrates an example of a rack.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive higher current than typical for power sources. The increased current enables the power sources to provide additional power to the components on each sled, enabling the components to operate at higher than typical frequencies. FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 204-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
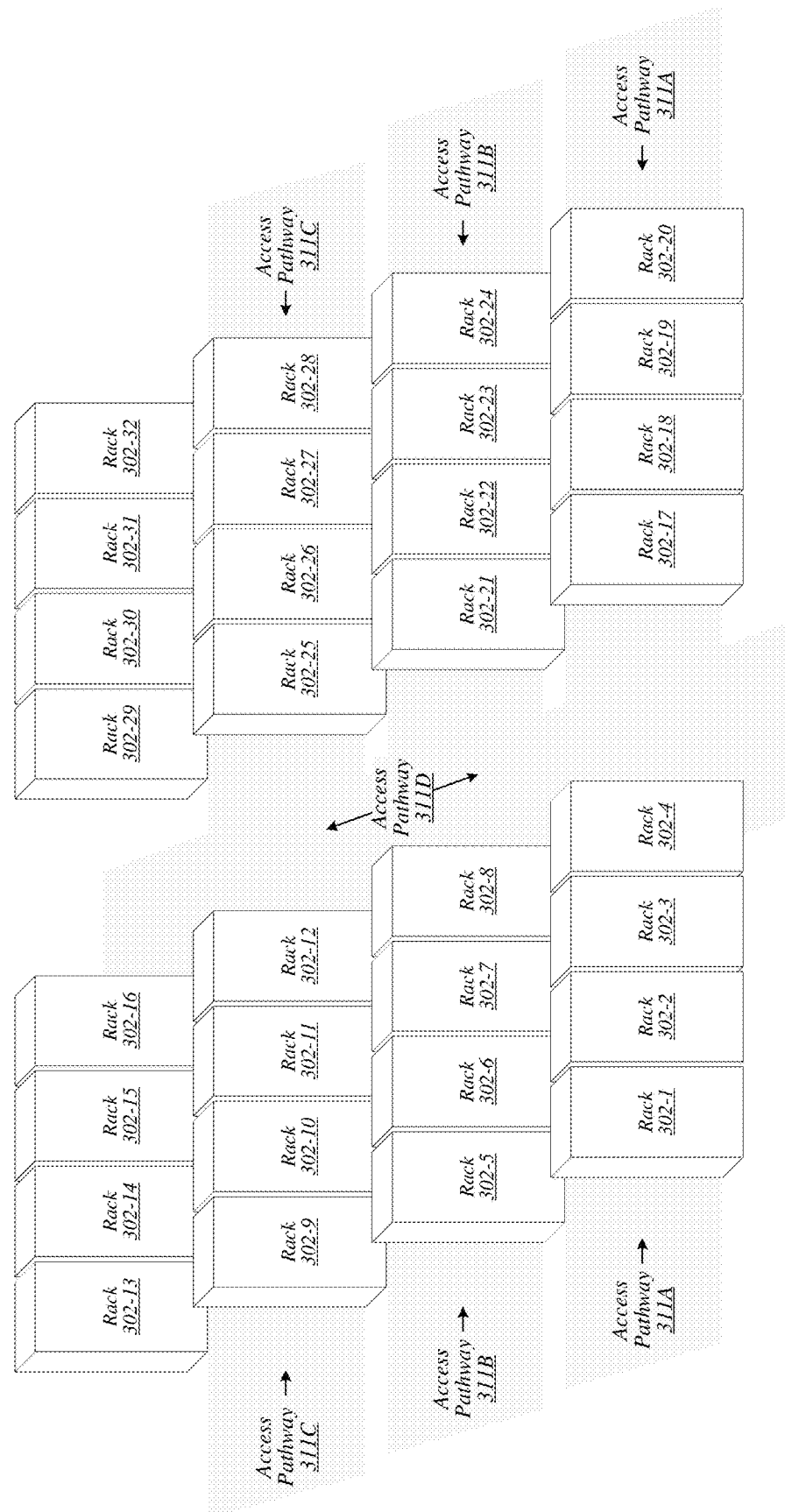
FIG. 3 illustrates an example of a data center.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
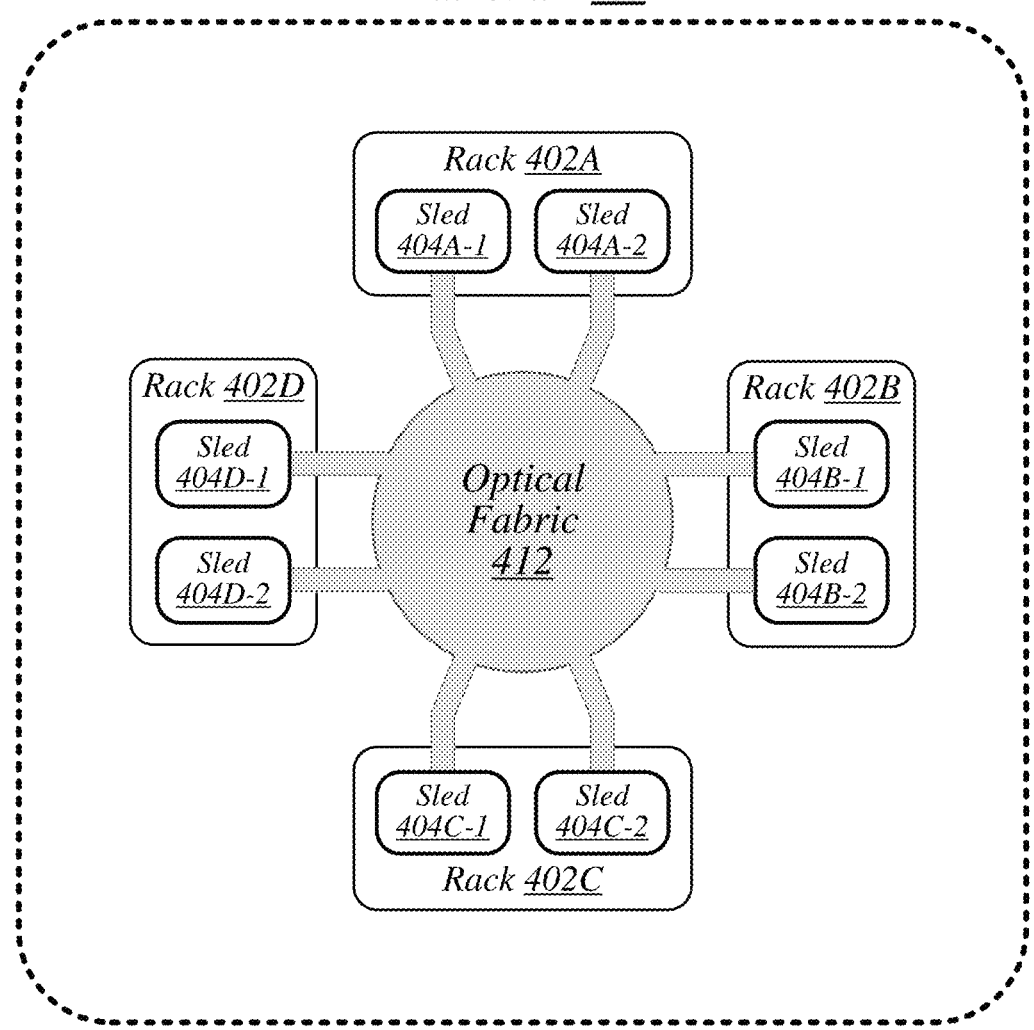
FIG. 4 illustrates an example of a data center.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
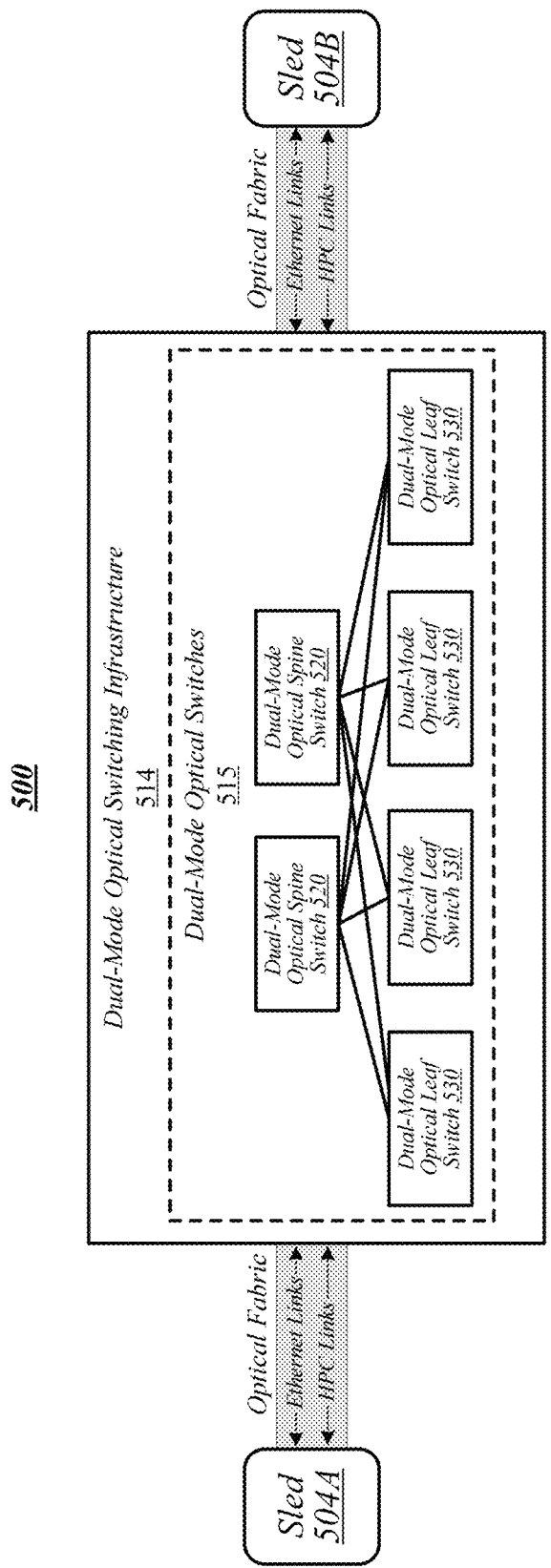
FIG. 5 illustrates an example of a switching infrastructure.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In embodiments, the dual-mode switch may be a single physical network wire that may be capable of carrying Ethernet or Onmi-Path communication, which may be auto-detected by the dual-mode optical switch 515 or configured by the Pod management controller. This allows for the same network to be used for Cloud traffic (Ethernet) or High Performance Computing (HPC), typically Onmi-Path or Infiniband. Moreover, and in some instances, an Onmi-Path protocol may carry Onmi-Path communication and Ethernet communication. In some embodiments, dual-mode optical switches 515 may constitute leaf switches 530 in a leaf-spine architecture additionally including one or more dual-mode optical spine switches 520. Note that in some embodiments, the architecture may not be a leaf-spine architecture, but may be a two-ply switch architecture to connect directly to the sleds.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
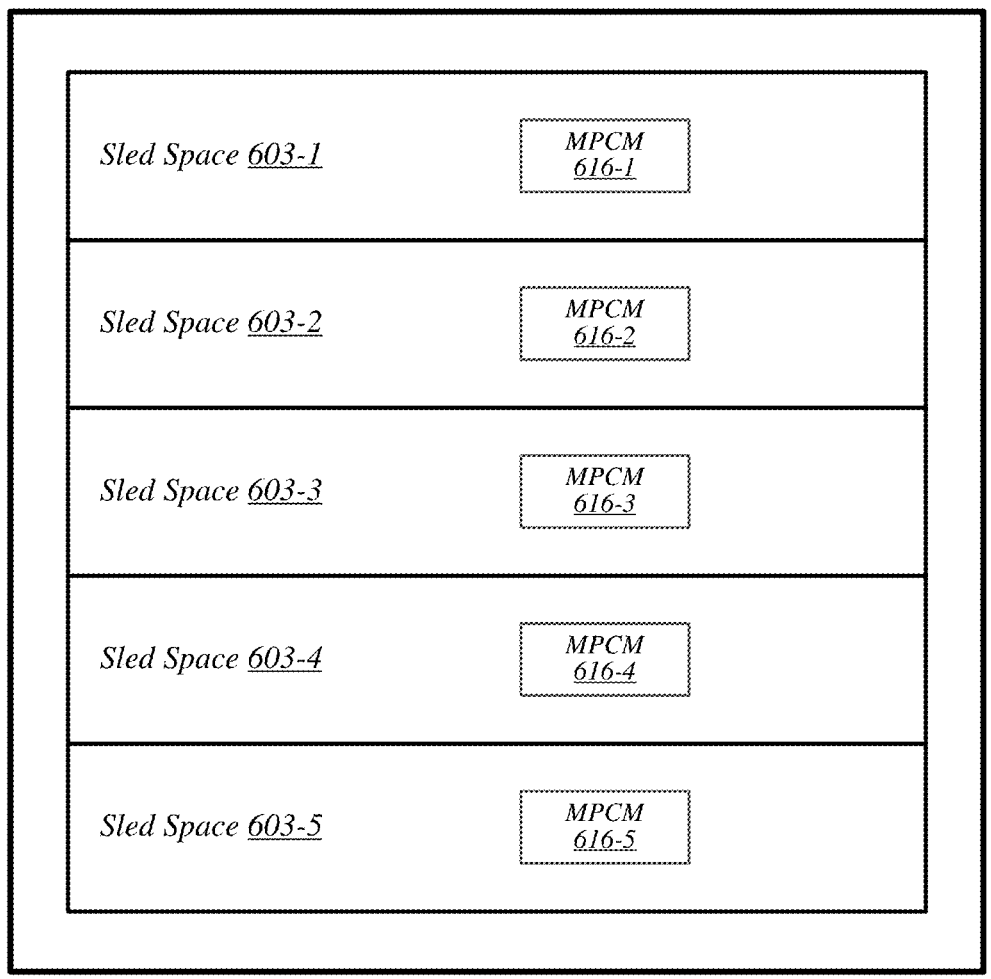
FIG. 6 illustrates and example of a data center.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5. In some instances, when a sled is inserted into any given one of sled spaces 603-1 to 603-5, the corresponding MPCM may couple with a counterpart MPCM of the inserted sled. This coupling may provide the inserted sled with connectivity to both signaling infrastructure and power infrastructure of the rack in which it is housed.

Figure 7:
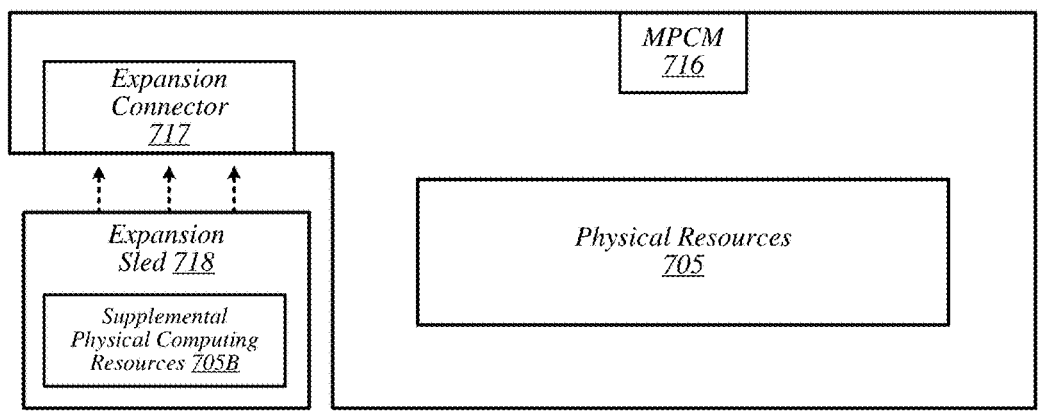
FIG. 7 illustrates an example of a sled.

Included among the types of sleds to be accommodated by rack architecture 600 may be one or more types of sleds that feature expansion capabilities. FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
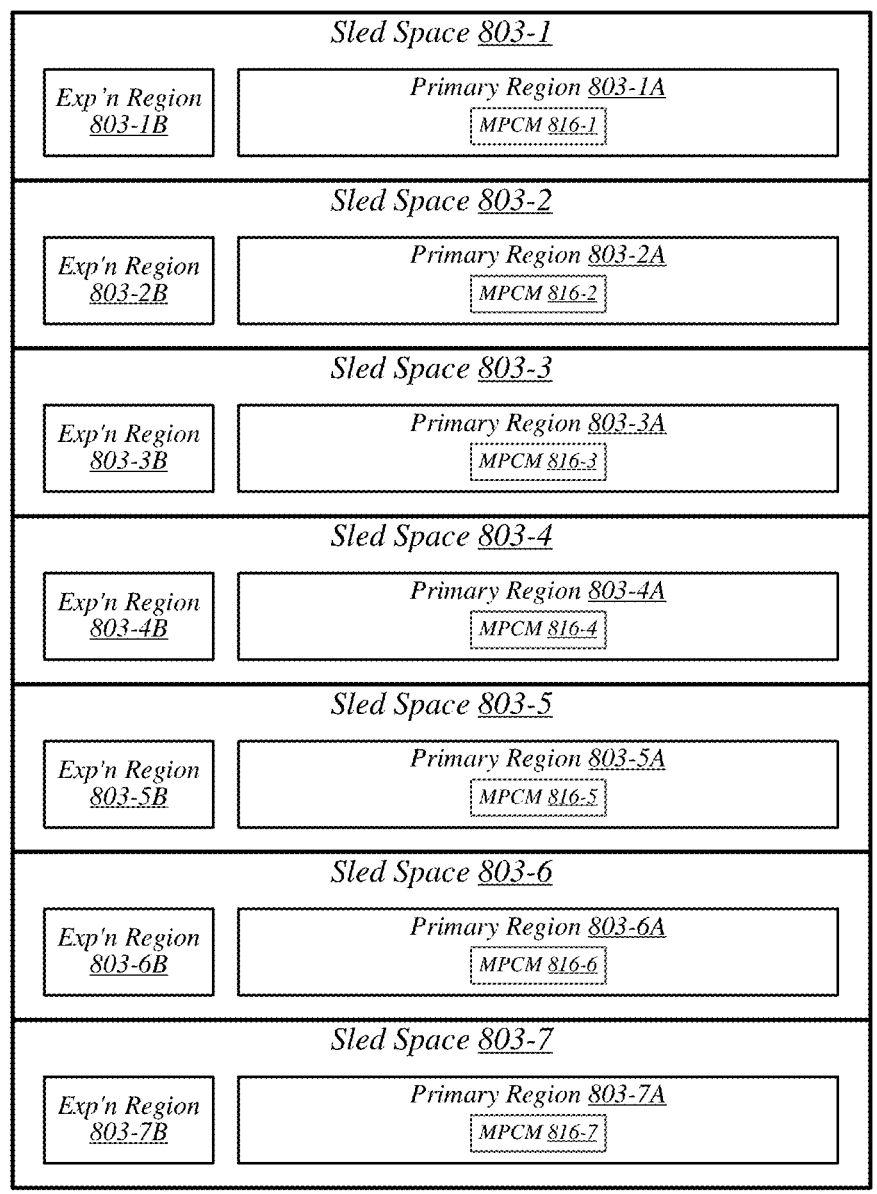
FIG. 8 illustrates an example of a data center.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
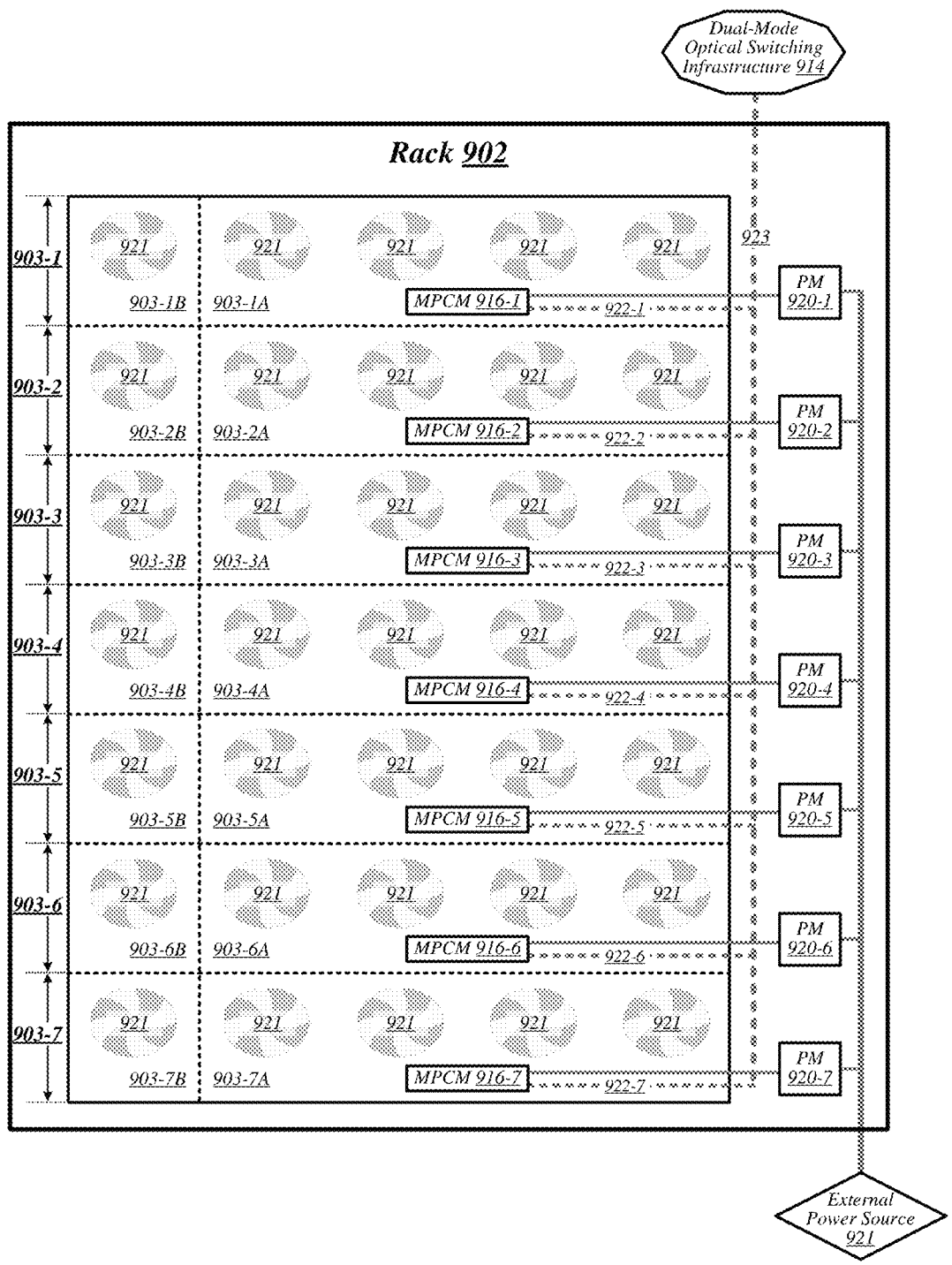
FIG. 9 illustrates an example of a data center.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
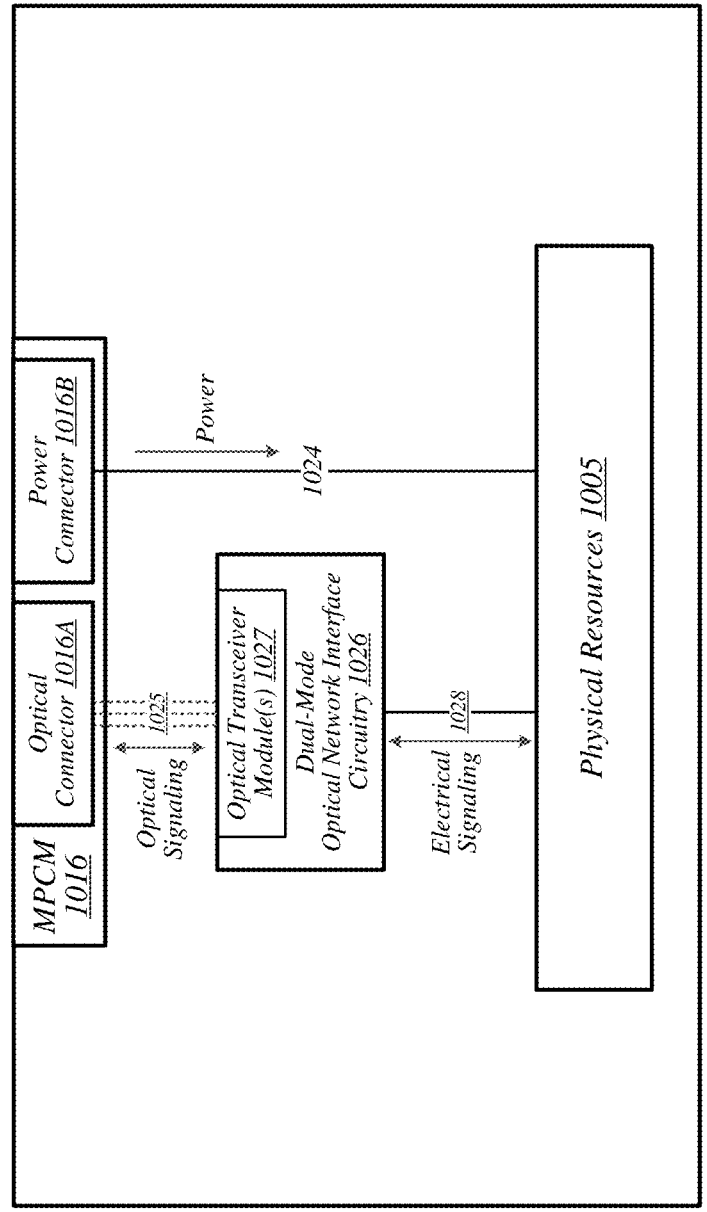
FIG. 10 illustrates an example of a sled.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
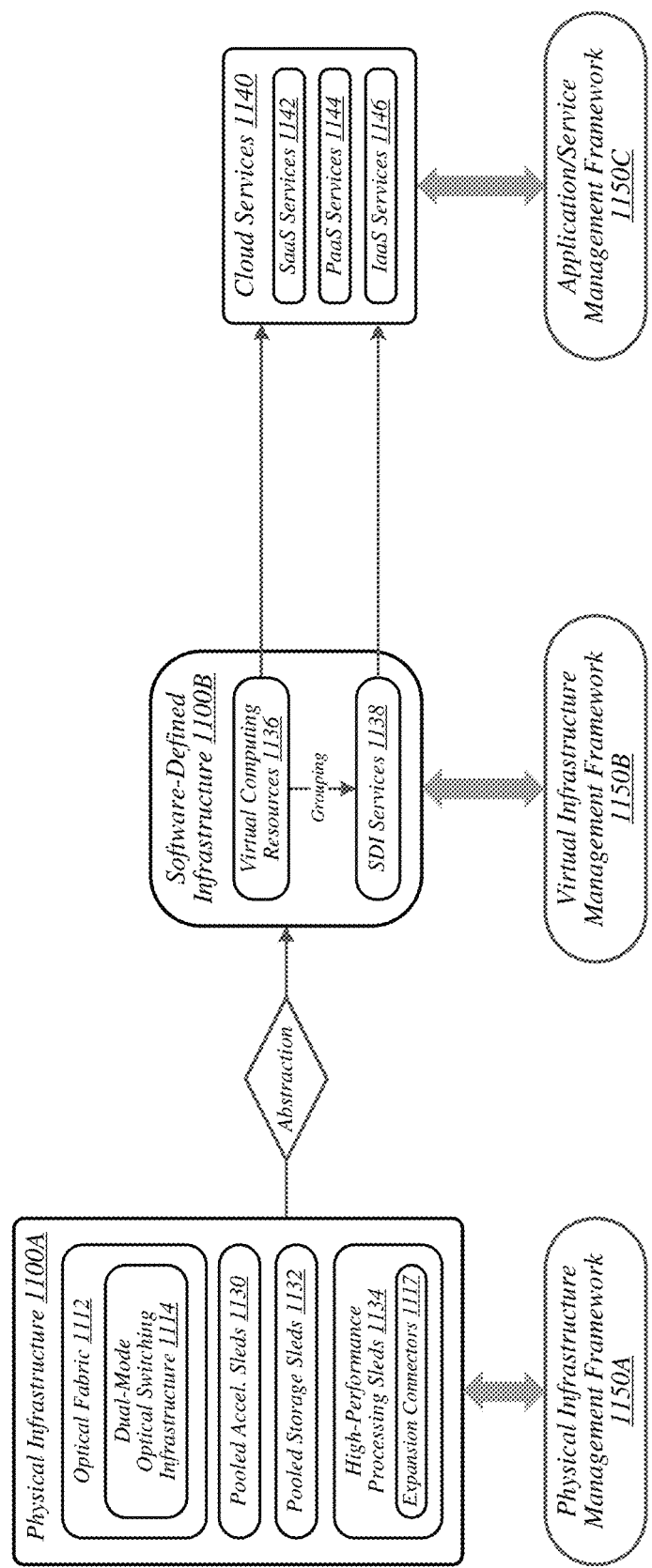
FIG. 11 illustrates an example of a data center.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is available globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
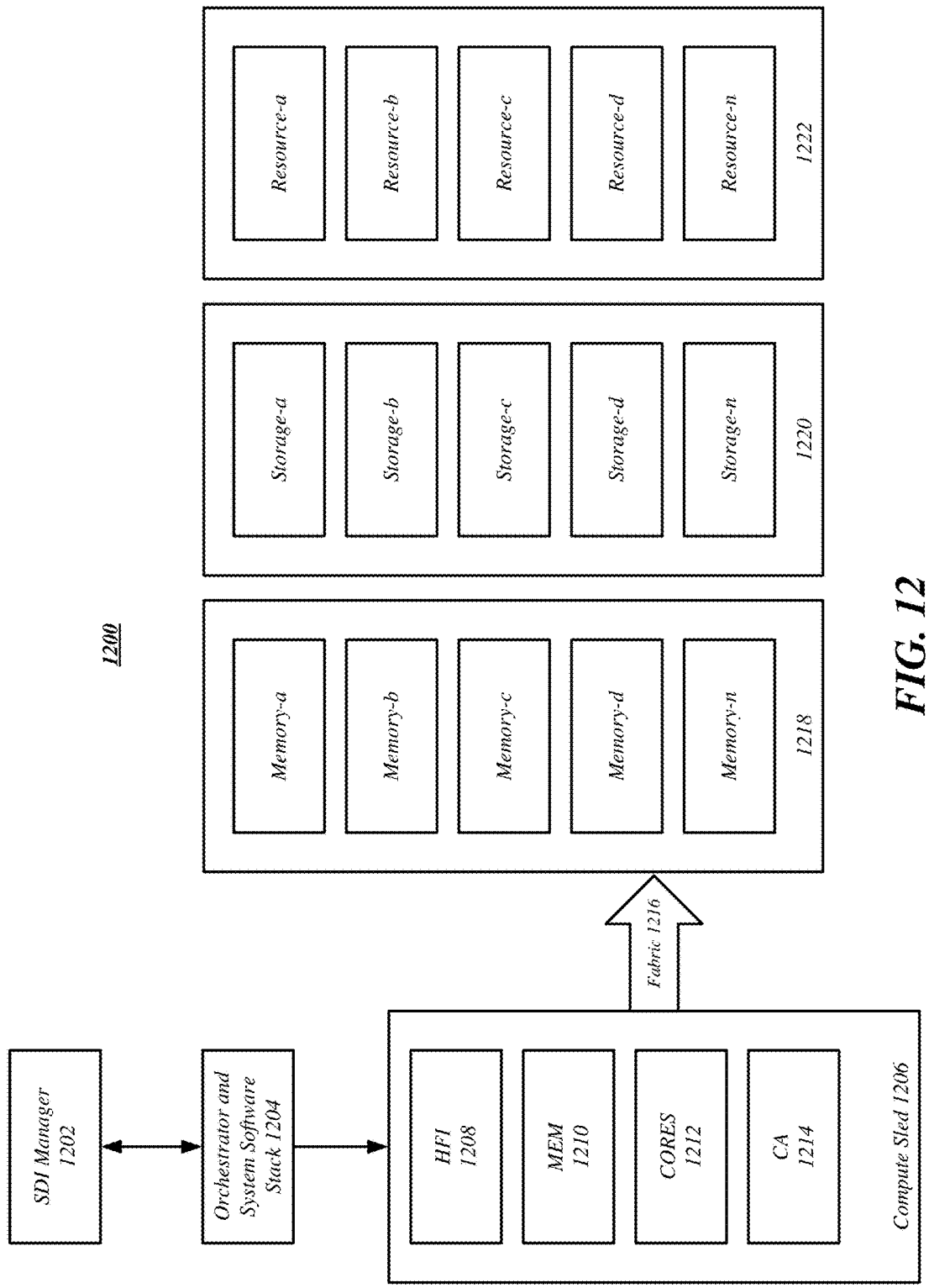
FIG. 12 illustrates a block diagram of a system according to an embodiment.

FIG. 12 illustrates a block diagram of a system according to an embodiment. System 1200 may be a SDI architecture, in which resources may be defined by applications, and composite nodes may be created from a set of available resources on an application-by-application basis. In some data centers, the resource selection and allocation for the application may be done by a resource manager, which may be operated separately from, or within, an orchestrator. Traditional architectures may be composed by a set of static platforms or nodes Ns={N1, ... , Nm} that the resource manager may allocate to the application based upon characteristics, properties, and/or requirements. Each node may include a set of resources with a certain characteristics (i.e., performance, capacity, etc.). The data center may be composed at the same time by different nodes with different types of resources, for example.

Forthcoming data center architectures may be based on SDI, such as the architecture illustrated in FIG. 12. In SDI architectures, applications may be executed on top of a composite node, which may be dynamically created by the SDI manager 1202 (i.e., a Rack Scale Design Pod Manager, in some exemplary embodiments), or created based upon user or application instructions in some embodiments. A Rack Scale Design may include a hardware architecture that includes the ability to dynamically compose physical hardware resources into the most optimal configuration (e.g., composed or composite node) for each workload using an open application programming interface standard. These composite nodes, which may be composed by different resources that are disaggregated from the platform and distributed in different parts of the data center, may be virtualized to the application and are shown as an isolated and "local" resource. In other words, resources may be physically spread out remotely from a computing platform and connected via a fabric, as described herein.

In general terms, SDI architectures may expose a set of pools of resources, such as memory pool 1218, storage pool 1220, and resource pool 1222, each comprising one or more nodes of a given resource, to the orchestrator 1204 and system software stack 1204. Orchestrator 1204, based on user requests or application requests, may request to SDI manager 1204 to compose a node based on those requirements. The composed node may be defined by SDI manager 1202, as described in detail herein, and returned to orchestrator 1204. Once a composed node is defined by SDI manager 1202 and received by orchestrator 1204, an application may be booted and deployed on the composed node, which may include one or more resources from a compute sled 1206 and one or more resources from memory pool 1218, storage pool 1220, and resource pool 1222, connected via fabric 1216. While three exemplary pools are illustrated, it can be appreciated that more or less pools may be used in various embodiments. Further, resource pool 1222 may include one or more data center resources, such as field-programmable gate arrays (FPGAs) or accelerators, for example. Compute sled 1206 may include one or more components, such as Host Fabric Interconnect/Interface (HFI) node 1208, MEM memory node 1210, CORES processing node 1212, and caching agent (CA) node 114, which may each be consistent with one or more of the embodiments described herein.

In an embodiment, CA node(s) 1214 may be the coherency agents within a node that process memory requests from the cores within the same node. Home Agents (HA) may be the node clusters that are responsible for processing memory requests from the CAs and may act as a home for part of the memory address space (one die may have multiple homes having a distributed address space mapping). Depending on the address space that requests are targeting, they may go to the same node's local memory, they may go the Unified Path Interconnect (UPI) agent (formerly called QPI or KTI) to route the request to the other processors within the same coherent domain or they may go to processors through the Host Fabric Interface (HFI) that are outside the coherent domain. All the processors connected through UPI may belong to the same coherent domain. One system may be composed by one or more coherent domains being all the coherent domains connected through fabric interconnect. For example high-performance computing systems (HPC) or data centers may be composed by N clusters or servers that can communicate with each other using fabric 1216. Using the fabric 1216, each coherent domain may expose some address regions to the other coherent domains. However, accesses between different coherent domains may not be coherent. Some techniques described herein may assume that a fabric interconnect is used, such as Omni-Path, as described herein, which may allow mapping address of memory ranges between different coherent domains.

Figure 13:
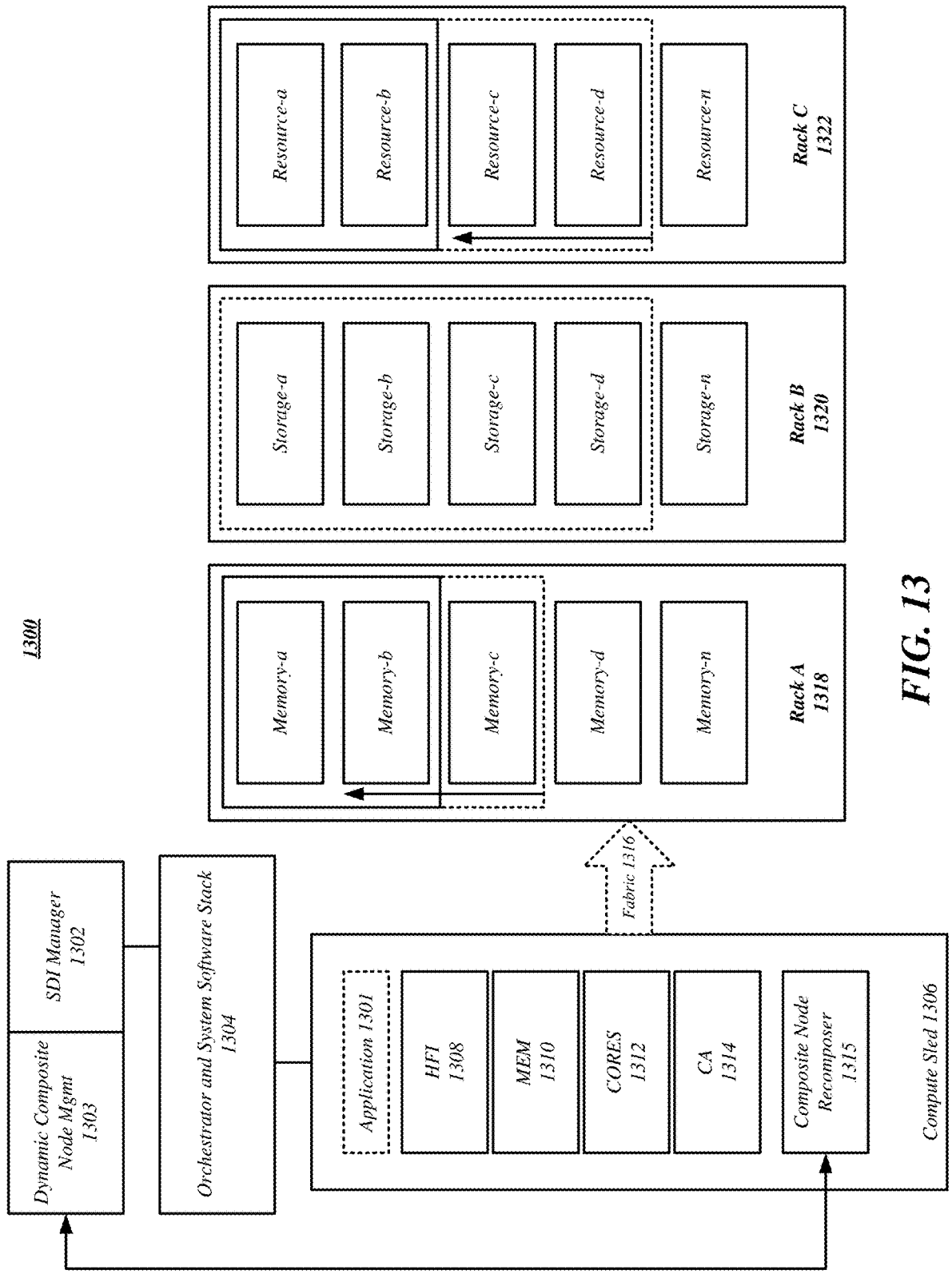
FIG. 13 illustrates a block diagram of a system according to an embodiment.

FIG. 13 illustrates a block diagram of a system 1300 according to an embodiment, which shares many elements with that of FIG. 12, described above. As shown in FIG. 13, one or more additional mechanisms may be configured in system 1300 to dynamically resize the composite node definition based on application requirements and characteristics. Additional components may include dynamic composite node management 1303 and composite node recomposer 1315. As described herein, these components, which may be implemented in hardware and/or software, may be configured to add malleability to a SDI system. As an example, as application 1301 may be running, in part, on racks 1318 and 1322, using three units of memory on rack 1318 and four units of memory on rack 1322. While these resources may once be required by application 1301, application 1301 may require less memory and resources over time, thus, as shown, one unit of memory from rack 1318 and two units of resources from rack 1322 may be reclaimed during runtime using the techniques described herein.

To achieve increased malleability through dynamic resource reallocation, embodiments may provide new mechanisms to the application, orchestrators, and software stack to dynamically change the definition of the composite node based on the requirements over time. Further, embodiments may provide a new block located in the compute sled that can be configured with minimum and maximum requirements for each disaggregated resource, that monitors the utilization of each of the resources, and that dynamically decides to release or acquire more elements of a particular resources.

First, composite node recomposer (CNR) 1315 may be added to compute sled 1306. CNR 1315 may be configured to monitor the utilization of pooled resources that the platform has (using performance and telemetry logic). This logic may, for example, identify resources that have not been used for N units of time. Some embodiments may utilize machine learning algorithms, and may decide to dynamically acquire or release a given amount of a given resource. If CNR 1315 detects that a given resource is being fully utilized by the local application, it may decide to acquire more of it through the SDI manager 1302 and notify the new available resource to the OS. The OS may expose this new resource to the hot software stack through existing plug and play features. Policies for how much and how resources are borrowed may be implemented depending on the data center requirements.

In an embodiment, SDI manager 1302 may be extended to include dynamic composite node manager 1303. In this manner, SDI manager 1302 may expose interfaces as well as logic that may allow orchestrator 1304 as well as the CNR 1315 to dynamically extend or reduce a certain amount of resource of a given type. The system address decoders located in current CAs as wells as the other decoding schemes in the node may be extended to be able to dynamically change how many of these resources are actually available to the local compute sled. Note that these resources may be transparently exposed to the application being executed in the compute node as if they were local resource. Therefore, when an application running in the compute sled accesses any of the disaggregated resources, the SDI manager 1302 is capable of identifying where the request and forward it to the correct resource and, when a recomposition happens, SDI manager tables may be transparently updated pointing to the new resources.

In an embodiment, the software stack 1304 may be extended in order to be adapted to use the techniques described herein. Since the described techniques include a software/hardware co-design approach, the orchestrator 204 may decide upfront how to allocate resources, how the resources can be added, or released. In an embodiment, the CNR 1315 (instead of the orchestrator 1304) may decide what resources are acquired or released and for how long and notify that to the operating system when resources are available or removed.

Figure 14:
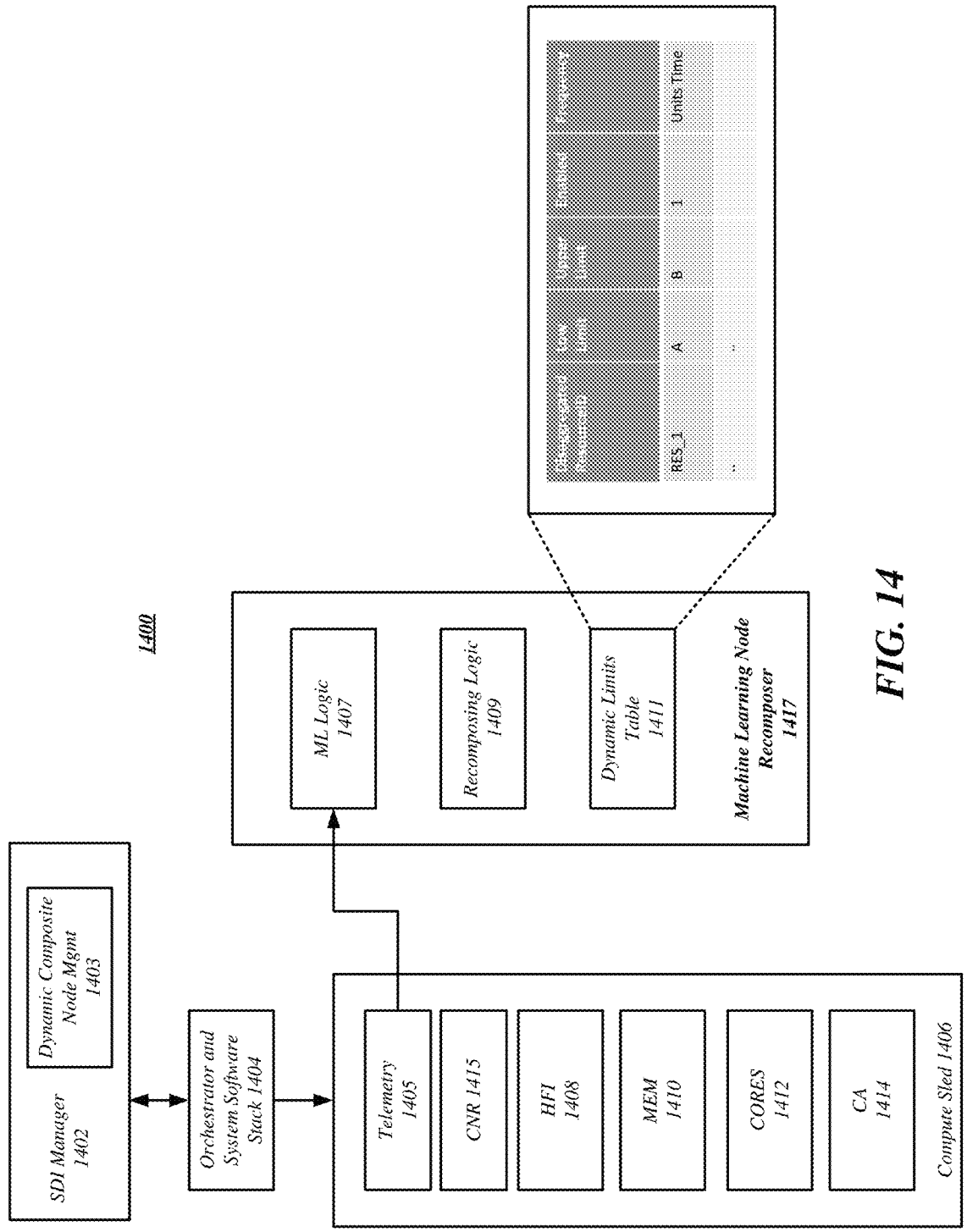
FIG. 14 illustrates a block diagram of a system according to an embodiment.

FIG. 14 illustrates a block diagram of a system according to an embodiment. In some embodiments, at least two modes are supported: (1) an automatic mode where the CNR 1415 decides when and how to do recomposition based on telemetry logic; and (2) when this logic is not used for a given resource, CNR 315 logic may expose a set of interfaces to the software stack (orchestrator instance or the application, for example) running on the compute node to do the actual recomposition.

In an embodiment, SDI manager 1402 may be extended by dynamic composite node management component 1403 in order to implement the flows described below as well as the corresponding actions that need to be taken to fulfill the requests. The SDI manager 1402 may check that the actual request can be fulfilled and also that the requestor has rights to carry out that particular request. In addition, some embodiments may make changes to the node architecture, i.e., the compute sled 1406. The system address decoders located in current CAs, as well as the other decoding schemes in the node, may be extended to be able to dynamically change how much of these resources are actually mapped to the local compute sled. Note that these resources may be transparently exposed to the application being executed in the composite node as if they were local resource. Thereby, when the application accesses a given address of a given resource (i.e., disaggregated memory), these decoders must be able to determine whether this memory is really currently mapped or a fault needs to be extended to the software stack (for example, page fault for memory). However, these may not imply real changes in the architecture. Most of current system address decoding schemes used in the node architecture used decoding rules that can be programmed in multiple ways and matching several different configurations.

As described above, some embodiments rely on CNR 1415 to monitor the utilization of the disaggregated resources that the platform has (using existing performance and telemetry logic). Telemetry component 1405, using algorithms that can determine a simple threshold for under or overused resources, or more complex machine learning algorithms 1407 (including FPGAs), may decide to remove or acquire temporarily resources to the local compute. How much resources are released or acquired may be configured in the dynamic limits table 1411. This table may allow specifying per resource type what are the limits tolerated (i.e., memory min: 10 GB, max 1 TB). The recomposing logic 1409 may use this table as well as the feedback from the telemetry component 1405 to decide whether the recomposition should happen, and how frequently, if it should happen. CNR 1415 may also uses the dynamic limits table

1411 to use indications that software stack may provide and, in some embodiments, the feature may be deactivated per resource. The CNR 1415 may be configured to generate a system interrupt to notify to the local OS that a specific resource has been unplugged or added in order to do the proper remapping, since it may need to update the corresponding data structures. In some embodiments, the system may address decoders of the node affected by this extension may need to be reprogrammed accordingly. The OS may expose these new resources or remove to the hot software stack through the existing plug and play features. Policies on how and how many resources are borrowed can be implemented depending on the data center requirements. In an embodiment, the system software stack 1404 may be extended as described above with respect to FIG. 13.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 15:
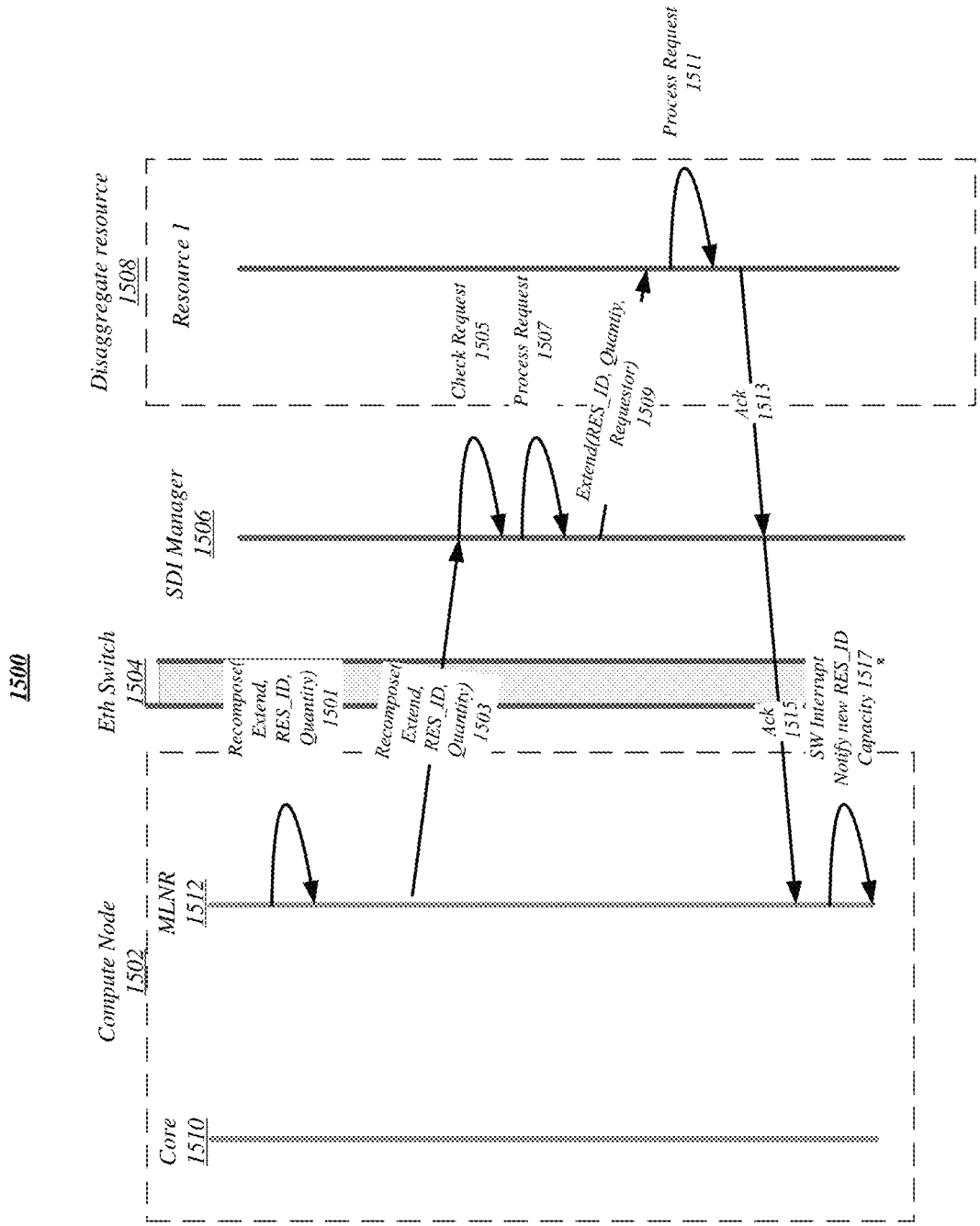
FIG. 15 illustrates a logic flow according to an embodiment.

FIG. 15 illustrates a logic flow 1500 according to an embodiment. Logic flow 1500 may extend SDI fabric 1504 with a new set of flows that may be needed in order to support the described techniques. Logic flow 1500 may illustrate how a dynamic extension of a given resource may occur according to some embodiments described herein. Logic flow 1500 includes a plurality of components, including compute node 1502, which may include processing core 1510 and machine learning node recomposer 1512. SDI fabric 1504 may connect compute node 1502 with SDI manager 1506, which in turn is connected to one or more resources. In the example of FIG. 15, a single disaggregated resource 1508 is illustrated, however, it can be appreciated that more resources of various types may be present.

As illustrated, it is assumed that the flow is started by the MLNR 1512. However, the flow would operate in a similar manner if a CNR, application running on the compute node 1502, or an orchestrator following application requirements initiated the flow. In this last case, it may be assumed that a process running in the compute node would work on behalf of the orchestrator. At 1501, MLNR 1512 may trigger the flow after monitoring utilization of resource 1508, for example, using a recompose instruction including a variety of parameters including whether to extend, a resource identifier (Res_ID), and quantity corresponding to the amount of extension of the resource requested. During monitoring, either through identifying a need for the resource, request by an application for additional resources, request by an orchestrator for additional resources on behalf of an application, or through machine learning techniques, MLNR 1512 may identify based on one or more criteria that resource 1508 should be extended.

At 1503, MLNR may request an extension of resource 1508, the request may include a resource identifier (Res_ID) and a quantity of the extension requested (e.g., additional bandwidth, storage, etc.). The request 1503 may be issued to SDI manager 1506 via SDI fabric 1504. SDI manager 1506 may check the request for validity and availability, and may process the request 1503 at 1507, if available. If not available, an indication may be sent via SDI fabric 1504 to the software stack. If available for the requested extension, SDI manager 1506 may issue a request 1509 to the resource 1508, including the resource identifier, quantity requested, and requestor identifier. Such request may be processed by the resource at 1511, acknowledged at 1513 and 1515, resulting in a software interrupt at 1517, indicating that the extension of resource 1508 has been processed. In some embodiments, software interrupt 1517 may also include a request for remapping of resources.

Figure 16:
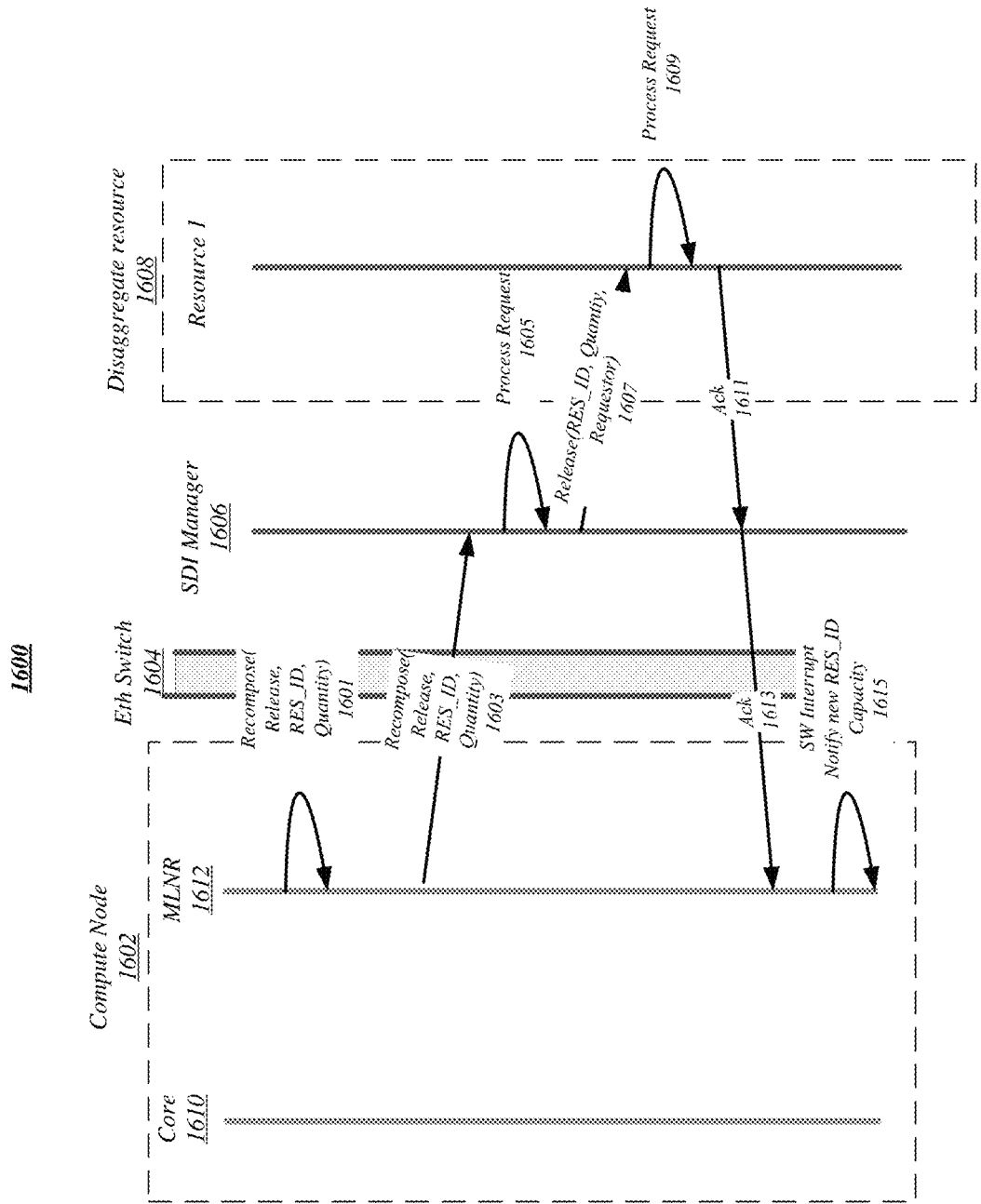
FIG. 16 illustrates a logic flow according to an embodiment.

FIG. 16 illustrates a logic flow 1600 according to an embodiment. Logic flow 1600 illustrates the flow of dynamically releasing a resource when it is not needed by the compute node 1602. Although flows 1500 and 1600 do not show how the CNR logic reconfigures the affected system address decoders, it is assumed that this is part of the recomposition process. Logic flow 1600 may extend SDI fabric 1604 with a new set of flows that may be needed in order to support the described techniques. Logic flow 1600 may illustrate how a dynamic release of a given resource may occur according to some embodiments described herein. Logic flow 1600 includes a plurality of components, including compute node 502, which may include processing core 1610 and machine learning node recomposer 1612. SDI fabric 1604 may connect compute node 1602 with SDI manager 1606, which in turn is connected to one or more resources. In the example of FIG. 16, a single disaggregated resource 1608 is illustrated, however, it can be appreciated that more resources of various types may be present.

As illustrated, it is assumed that the flow is started by the MLNR 1612. However, the flow would operate in a similar manner if a CNR, application running on the compute node 1602, or an orchestrator following application requirements initiated the flow. In this last case, it may be assumed that a process running in the compute node would work on behalf of the orchestrator. At 1601, MLNR 1612 may trigger the flow after monitoring utilization of resource 1608, for example, using a recompose instruction including a variety of parameters including whether to release, a resource identifier (Res_ID), and quantity corresponding to the amount of release of the resource requested. During monitoring, either through identifying a need for the resource, identification of an underutilized resource over a period of time, request by an application for additional resources, request by an orchestrator for additional resources on behalf of an application, or through machine learning techniques, MLNR 1612 may identify based on one or more criteria that resource 1608 should be released in whole, or in part.

At 1603, MLNR may request a release of resource 1608, the request may include a resource identifier and a quantity of the release requested (e.g., bandwidth, storage, etc.). The request 1603 may be issued to SDI manager 1606 via SDI fabric 1604. SDI manager 1606 may check the request for validity and availability, and may process the request 1603 at 1605. If not available, such as due to utilization of the previously underutilized resource, an indication may be sent via SDI fabric 1604 to the software stack. If available for the requested release, SDI manager 1606 may issue a request 1607 to the resource 1608, including the resource identifier, quantity requested, and requestor identifier. Such request may be processed by the resource at 1609, acknowledged at 1611 and 1613, resulting in a software interrupt at 1615, indicating that the release of resource 1608 has been processed. In some embodiments, software interrupt 1615 may also include a request for remapping of resources.

Figure 17:
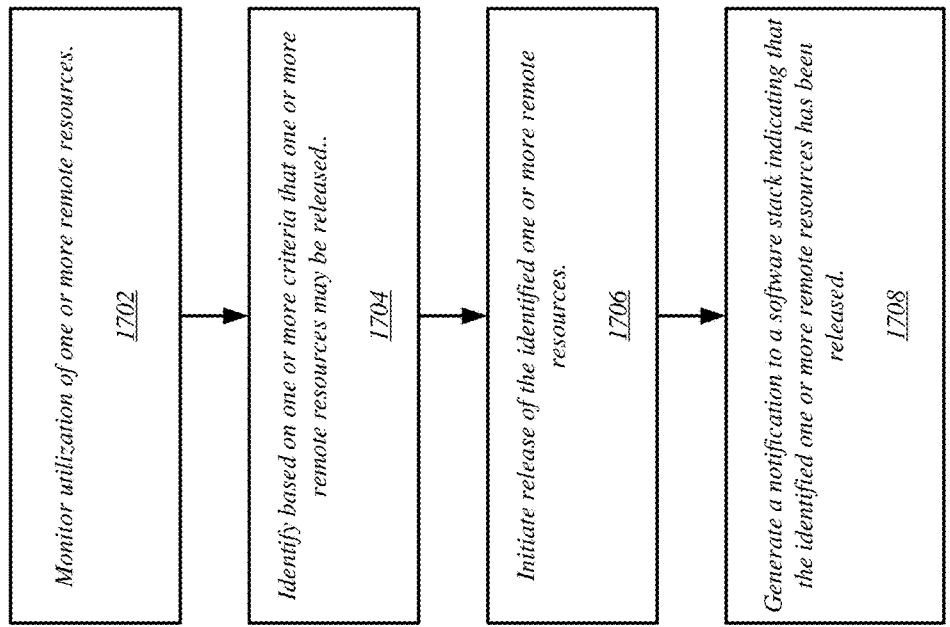
FIG. 17 illustrates a logic flow according to an embodiment.

FIG. 17 illustrates a logic flow 1700 according to an embodiment. As set forth within FIG. 17, a compute node, including one or more processor circuits, may be configured to access one or more remote resources via a fabric, the compute node may be configured to monitor utilization of the one or more remote resources at 1702. In some embodiments, monitoring remote resources for release may be initiated based upon a detected need for additional resources for an application, which may be detected by the CNR or MLNR, described above. Further, one or more criteria may be based upon a dynamic limits table, which may be stored within a telemetry component, or a machine learning component, in some embodiments. The dynamic limits table may set forth upper and lower limits for each of a plurality of remote resources. The upper limits and lower limits may be used to determine whether resources should be released (being utilized below the lower limit) or extended (need is above the upper limit). While the flow of FIG. 17 is focused on the release of resources, it can be appreciated that a similar technique may be used to extend resources based upon a determined need to do so.

At 1704, the compute node may be further configured to identify based on one or more criteria that one or more remote resources may be released. As described herein, resources may be released because they have been under-utilized for a period of time or machine learning logic has determined they are no longer needed. In embodiments that request extension of a resource, criteria may include, for example, a determination by an application, orchestrator, CNR, or MLNR, that more of a remote resource is necessary for execution of one or more applications executing on a compute node.

At 1706, the compute node may be configured to initiate release of identified one or more remote resources, which may be performed by sending a message via an SDI fabric to an SDI manager. At 1708, the compute node may be configured to generate a notification to a software stack indicating that the identified one or more remote resources has been released. In some embodiments, the notification may include a system interrupt to initiate a resource remapping. In this manner, the software stack may be able to see the released resources as available resources that may be used.

Figure 18:
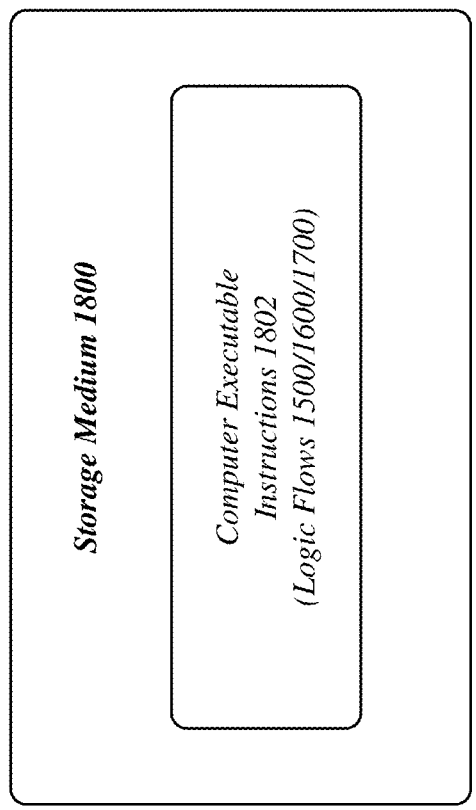
FIG. 18 illustrates an embodiment of computer-readable storage medium.

FIG. 18 illustrates an embodiment of a storage medium 1800. The storage medium 1800 may comprise an article of manufacture. In some examples, the storage medium 1800 may include any non-transitory computer readable medium or machine readable medium, such as an optical, magnetic or semiconductor storage. The storage medium 1800 may store various types of computer executable instructions e.g., 1802). For example, the storage medium 1800 may store various types of computer executable instructions to implement logic flows described herein using one or more processors and components described herein, such as logic flows 1500, 1600, and/or 1700 (in whole or in part). In alternate embodiments, computer executable instructions 1802 may be bit streams for configuring reprogrammable circuits of a hardware accelerator to implement logic flows described herein, such as logic flows 1500, 1600, and/or 1700 (in whole or in part).

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

The various elements of the devices described herein may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the disclosure.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1

A software-defined infrastructure system, comprising: a compute node, including one or more processor circuits, arranged to access one or more remote resources via a fabric, the compute node configured to: monitor utilization of the one or more remote resources; identify based on one or more criteria that one or more remote resources may be released; initiate release of identified one or more remote resources; and generate a notification to a software stack indicating that the identified one or more remote resources has been released.

Example 2

The system of Example 1, wherein the notification includes a system interrupt to initiate a resource remapping.

Example 3

The system of Example 1, wherein the one or more criteria include underutilization for a predetermined period of time.

Example 4

The system of Example 1, wherein the one or more criteria are determined using a machine learning component.

Example 5

The system of Example 1, wherein the monitoring is initialized based upon a detected need for additional resources.

Example 6

The system of Example 1, wherein the one or more criteria are based on a dynamic limits table stored within a telemetry component.

Example 7

The system of Example 6, wherein the dynamic limits table is stored within a machine learning node recomposer of the telemetry component.

Example 8

The system of Example 6, wherein the dynamics limits table includes upper and lower limits for each of a plurality of resource types.

Example 9

The system of Example 1, wherein the one or more remote resources are exposed to the software stack as local resources.

Example 10

The system of Example 1, wherein the monitoring is performed by a composite node recomposer component within the compute node.

Example 11

A computer-implemented method, comprising: monitoring utilization of one or more remote resources connected via a fabric to a compute node including one or more processor circuits; identifying based on one or more criteria that one or more remote resources may be released; initiating release of identified one or more remote resources; and generating a notification to a software stack indicating that the identified one or more remote resources has been released.

Example 12

The method of Example 11, wherein the notification includes a system interrupt to initiate a resource remapping.

Example 13

The method of Example 11, wherein the one or more criteria include underutilization for a predetermined period of time.

Example 14

The method of Example 11, wherein the one or more criteria are determined using a machine learning component.

Example 15

The method of Example 11, wherein the monitoring is initialized based upon a detected need for additional resources.

Example 16

The method of Example 11, wherein the one or more criteria are based on a dynamic limits table stored within a telemetry component.

Example 17

The method of Example 16, wherein the dynamic limits table is stored within a machine learning node recomposer of the telemetry component.

Example 18

The method of Example 16, wherein the dynamics limits table includes upper and lower limits for each of a plurality of resource types.

Example 19

The method of Example 11, wherein the one or more remote resources are exposed to the software stack as local resources.

Example 20

The method of Example 11, wherein the monitoring is performed by a composite node recomposer component within the compute node.

Example 21

An article comprising a non-transitory computer-readable storage medium that stores instructions for execution by processing circuitry of a compute node of a software-defined infrastructure system, the instructions to cause the compute node to: monitor utilization of one or more remote resources connected via a fabric to the compute node; identify based on one or more criteria that one or more remote resources may be released; initiate release of identified one or more remote resources; and generate a notification to a software stack indicating that the identified one or more remote resources has been released.

Example 22

The article of Example 21, wherein the notification includes a system interrupt to initiate a resource remapping.

Example 23

The article of Example 21, wherein the one or more criteria include underutilization for a predetermined period of time.

Example 24

The article of Example 21, wherein the one or more criteria are determined using a machine learning component.

Example 25

The article of Example 21, wherein the monitoring is initialized based upon a detected need for additional resources.

Example 26

The article of Example 21, wherein the one or more criteria are based on a dynamic limits table stored within a telemetry component.

Example 27

The article of Example 26, wherein the dynamic limits table is stored within a machine learning node recomposer of the telemetry component.

Example 28

The article of Example 26, wherein the dynamics limits table includes upper and lower limits for each of a plurality of resource types.

Example 29

The article of Example 21, wherein the one or more remote resources are exposed to the software stack as local resources.

Example 30

The article of Example 21, wherein the monitoring is performed by a composite node recomposer component within the compute node.

Example 31

A compute node of a software-defined infrastructure system, comprising: means for monitoring utilization of one or more remote resources connected via a fabric to the compute node; means for identifying based on one or more criteria that one or more remote resources may be released; means for initiating release of identified one or more remote resources; and means for generating a notification to a software stack indicating that the identified one or more remote resources has been released.

Example 32

The compute node of Example 31, wherein the notification includes a system interrupt to initiate a resource remapping.

Example 33

The compute node of Example 31, wherein the one or more criteria include underutilization for a predetermined period of time.

Example 34

The compute node of Example 31, wherein the one or more criteria are determined using a machine learning component.

Example 35

The compute node of Example 31, wherein the monitoring is initialized based upon a detected need for additional resources.

Example 36

The compute node of Example 31, wherein the one or more criteria are based on a dynamic limits table stored within a telemetry component.

Example 37

The compute node of Example 36, wherein the dynamic limits table is stored within a machine learning node recomposer of the telemetry component.

Example 38

The compute node of Example 36, wherein the dynamics limits table includes upper and lower limits for each of a plurality of resource types.

Example 39

The compute node of Example 31, wherein the one or more remote resources are exposed to the software stack as local resources.

Example 40

The compute node of Example 31, wherein the monitoring is performed by a composite node recomposer component within the compute node.

Example 41

An apparatus, comprising: at least one memory; at least one processor; and logic, at least a portion of the logic comprised in hardware and executed by the at least one processor, the logic to: monitor utilization of one or more remote resources connected via a fabric to the compute node; identify based on one or more criteria that one or more remote resources may be released; initiate release of identified one or more remote resources; and generate a notification to a software stack indicating that the identified one or more remote resources has been released.

Example 42

The apparatus of Example 41, wherein the notification includes a system interrupt to initiate a resource remapping.

Example 43

The apparatus of Example 41, wherein the one or more criteria include underutilization for a predetermined period of time.

Example 44

The apparatus of Example 41, wherein the one or more criteria are determined using a machine learning component.

Example 45

The apparatus of Example 41, wherein the monitoring is initialized based upon a detected need for additional resources.

Example 46

The apparatus of Example 41, wherein the one or more criteria are based on a dynamic limits table stored within a telemetry component.

Example 47

The apparatus of Example 46, wherein the dynamic limits table is stored within a machine learning node recomposer of the telemetry component.

Example 48

The apparatus of Example 46, wherein the dynamics limits table includes upper and lower limits for each of a plurality of resource types.

Example 49

The apparatus of Example 41, wherein the one or more remote resources are exposed to the software stack as local resources.

Example 50

The apparatus of Example 41, wherein the monitoring is performed by a composite node recomposer component within the compute node.

The invention claimed is:

1. A software-defined infrastructure system, comprising:
a compute node, including one or more processor circuits, arranged to access one or more remote resources via an optical fabric, the optical fabric to comprise a plurality of dual-mode optical switches, the compute node configured to:
monitor utilization of the one or more remote resources;
identify, based on one or more criteria, that the one or more remote resources may be released;
initiate release of the identified one or more remote resources; and
transmit a notification to a software stack via the optical fabric indicating that the identified one or more remote resources has been released, wherein the notification comprises: (i) an identifier of the identified one or more remote resources, and (ii) an amount of the identified one or more remote resources.

2. The system of claim 1, wherein the notification includes a system interrupt to initiate a resource remapping, wherein the notification further comprises an identifier of the compute node initiating the release.

3. The system of claim 1, wherein the one or more criteria include underutilization for a predetermined period of time, wherein the one or more remote resources comprise physical resources of at least a first remote system and a second remote system, wherein the physical resources of the first remote system are released, wherein the physical resources of the second remote system are not released based on monitoring of the physical resources of the second remote system and the one or more criteria.

4. The system of claim 1, wherein the one or more criteria comprise one or more dynamic resource limits determined using a machine learning component.

5. The system of claim 1, wherein the monitoring is initialized based upon a detected need for additional resources, the optical fabric to further comprise an optical signaling media, the dual-mode optical switches to receive data from the compute node via the optical signaling media according to a first mode and a second mode, the first mode to comprise Ethernet protocol communications, the second mode to comprise high performance computing link-layer protocol communications.

6. The system of claim 1, wherein the one or more criteria are based on a dynamic limits table stored within a telemetry component.

7. The system of claim 6, wherein the dynamic limits table is stored within a machine learning node recomposer of the telemetry component.

8. The system of claim 6, wherein the dynamic limits table includes upper and lower limits for each of a plurality of resource types.

9. The system of claim 1, wherein the one or more remote resources are exposed to the software stack as local resources to an application executing on the one or more resources, wherein the one or more remote resources comprise physical resources of at least two remote systems accessible via the optical fabric.

10. The system of claim 1, wherein the monitoring is performed by a composite node recomposer component within the compute node.

11. A computer-implemented method, comprising:
monitoring utilization of one or more remote resources connected via an optical fabric to a compute node including one or more processor circuits, the optical fabric to comprise a plurality of dual-mode optical switches;
identifying, based on one or more criteria, that the one or more remote resources may be released;
initiating release of the identified one or more remote resources; and
transmitting a notification to a software stack via the optical fabric indicating that the identified one or more remote resources has been released, wherein the notification comprises: (i) an identifier of the identified one or more remote resources, and (ii) an amount of the identified one or more remote resources.

12. The method of claim 11, wherein the notification includes a system interrupt to initiate a resource remapping, wherein the notification further comprises an identifier of the compute node initiating the release.

13. The method of claim 11, wherein the one or more criteria include underutilization for a predetermined period of time, wherein the one or more remote resources comprise physical resources of at least a first remote system and a second remote system, wherein the physical resources of the first remote system are released, wherein the physical resources of the second remote system are not released based on monitoring of the physical resources of the second remote system and the one or more criteria.

14. The method of claim 11, wherein the one or more criteria comprise one or more dynamic resource limits determined using a machine learning component.

15. The method of claim 11, wherein the monitoring is initialized based upon a detected need for additional resources, the optical fabric to further comprise an optical signaling media, the dual-mode optical switches to receive data from the compute node via the optical signaling media according to a first mode and a second mode, the first mode to comprise Ethernet protocol communications, the second mode to comprise high performance computing link-layer protocol communications.

16. The method of claim 11, wherein the one or more criteria are based on a dynamic limits table stored within a telemetry component.

17. The method of claim 16, wherein the dynamic limits table is stored within a machine learning node recomposer of the telemetry component.

18. The method of claim 16, wherein the dynamic limits table includes upper and lower limits for each of a plurality of resource types.

19. The method of claim 11, wherein the one or more remote resources are exposed to the software stack as local resources to an application executing on the one or more resources, wherein the one or more remote resources comprise physical resources of at least two remote systems accessible via the optical fabric.

20. The method of claim 11, wherein the monitoring is performed by a composite node recomposer component within the compute node.

21. An article comprising a non-transitory computer-readable storage medium that stores instructions for execution by processing circuitry of a compute node of a software-defined infrastructure system, the instructions to cause the compute node to:
monitor utilization of one or more remote resources connected via an optical fabric to the compute node, the optical fabric to comprise a plurality of dual-mode optical switches;
identify, based on one or more criteria, that the one or more remote resources may be released;
initiate release of the identified one or more remote resources; and
transmit a notification to a software stack via the optical fabric indicating that the identified one or more remote resources has been released, wherein the notification comprises: (i) an identifier of the identified one or more remote resources, and (ii) an amount of the identified one or more remote resources.

22. The article of claim 21, wherein the notification includes a system interrupt to initiate a resource remapping, wherein the notification further comprises an identifier of the compute node initiating the release.

23. The article of claim 21, wherein the one or more criteria include underutilization for a predetermined period of time, wherein the one or more remote resources comprise physical resources of at least a first remote system and a second remote system, wherein the physical resources of the first remote system are released, wherein the physical resources of the second remote system are not released based on monitoring of the physical resources of the second remote system and the one or more criteria.

24. The article of claim 21, wherein the one or more criteria comprise one or more dynamic resource limits determined using a machine learning component.

25. The article of claim 21, wherein the monitoring is initialized based upon a detected need for additional resources, the optical fabric to further comprise an optical signaling media, the dual-mode optical switches to receive data from the compute node via the optical signaling media according to a first mode and a second mode, the first mode to comprise Ethernet protocol communications, the second mode to comprise high performance computing link-layer protocol communications.

* * * * *